W. EDDY.
Plow-Clevis.
No. 65,357.
Patented June 4, 1867.
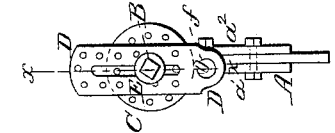
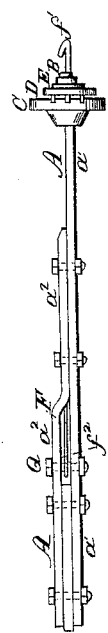 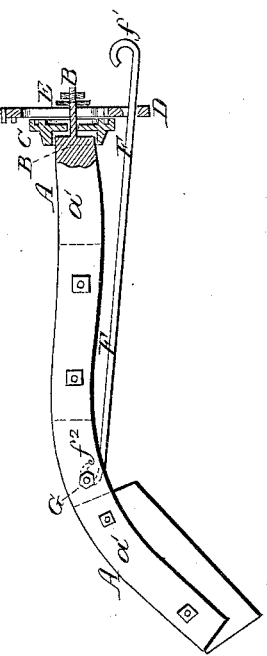
Witnesses
Theo Tusche
J A Service
Inventor.
Walden Eddy
Per Munn & Co
Attys

United States Patent Office.

WALDEN EDDY, OF GREENWICH, NEW YORK.

Letters Patent No. 65,357, dated June 4, 1867.

---

PLOUGH-BEAMS.

---

*The Schedule referred to in these Letters Patent and making part of the same.*

---

TO ALL WHOM IT MAY CONCERN:

Be it known that I, WALDEN EDDY, of Greenwich, in the county of Washington, and State of New York, have invented a new and useful improvement in Wrought-Iron Plough-Beams; and I do hereby declare that the following is a full, clear, and exact description thereof, which will enable others skilled in the art to make and use the same, reference being had to the accompanying drawings, forming part of this specification, in which—

Figure 1 is a top view of my improved plough-beam.

Figure 2 is a side view of the same, part of its forward end being broken away to show the construction.

Figure 3 is a front end view of the same.

Similar letters of reference indicate like parts.

My invention has for its object to improve the construction of wrought-iron plough-beams so as to make them easier of manufacture and more efficient in operation; and it consists in the manner of forming the adjusting bolt upon the end of the plough-beam, and in the manner of attaching the rear end of the draught-rod to the plough-beam, as hereinafter more fully described.

A is the plough-beam, which is formed of two wrought-iron bars, $a^1$ and $a^2$, made in the proper shape and bolted together in the usual manner. The forward end of the bar $a^1$ is drawn out and formed into a bolt, B, as shown in fig. 2. C is a disk having a hole through its centre for the passage of the bolt B, and having a socket formed upon its rear side fitting upon the forward end of the plough-beam A. D is the adjusting bar or plate, having a longitudinal slot formed through it for the passage of the bolt B. To the rear side of the bar D is attached a number of pins fitting into holes in the disk C, and so arranged that however the bar D may be adjusted a sufficient number of said pins will enter the said holes to hold the said bar securely in place. The disk C and bar or plate D are secured to the end of the plough-beam A by a washer and nut, E, as shown in the drawings. F is the draught-bar which passes through a hole in the lower end of the bar D, as shown in figs. 2 and 3. $f^1$ is a hook formed upon the forward end of the bar F for the attachment of the horses. The rear end of the draught-bar F enters the space between the bars $a^1$ and $a^2$ of the beam A, and has a hook or eye, $f^2$, formed upon it, through which the bolt G passes which secures it to the plough-beam. As it is impossible to make wrought-iron plough-beams exactly alike, or to make them all perfectly true, this construction enables the draught-bar to be so adjusted as to counteract any slight irregularity in shape of the said plough-beams, as well as to adjust them to cut a furrow of any desired width or depth.

What I claim as new, and desire to secure by Letters Patent, is—

1. Forming the adjusting bolt B solidly upon and out of the forward end of the plough-beam A, substantially as herein shown and described.

2. Securing the rear end of the draught-bar F in the space between the bars $a^1$ and $a^2$ of the plough-beam A by a bolt G passing through an eye or hook, $f^2$, formed upon the rear end of the said draught-bar F, substantially as herein shown and described and for the purpose set forth.

WALDEN EDDY.

Witnesses:
ALONZO T. MASON,
JAMES I. LOURIE.